(12) United States Patent
Koo et al.

(10) Patent No.: US 9,474,998 B2
(45) Date of Patent: Oct. 25, 2016

(54) COMBINED CARBON DIOXIDE CAPTURE AND DESALINATION DEVICE

(71) Applicant: Industry-University Cooperation Foundation Hanyang University Erica Campus, Ansan-si, Gyeonggi-do (KR)

(72) Inventors: Sung Mo Koo, Seoul (KR); Sung Min Shim, Anyang-si (KR); Sang Jin Lee, Seoul (KR)

(73) Assignee: Industry-University Cooperation Foundation Hanyang University Erica Campus, Ansan-si, Gyeonggi-do (KR)

( * ) Notice: Subject to any disclaimer, the term of this patent is extended or adjusted under 35 U.S.C. 154(b) by 420 days.

(21) Appl. No.: 14/359,378

(22) PCT Filed: Nov. 21, 2012

(86) PCT No.: PCT/KR2012/009891
§ 371 (c)(1),
(2) Date: Aug. 20, 2014

(87) PCT Pub. No.: WO2013/077635
PCT Pub. Date: May 30, 2013

(65) Prior Publication Data
US 2015/0343368 A1 Dec. 3, 2015

(30) Foreign Application Priority Data

Nov. 22, 2011 (KR) .................. 10-2011-0122451

(51) Int. Cl.
*B01D 53/14* (2006.01)
*C02F 1/44* (2006.01)
(Continued)

(52) U.S. Cl.
CPC ....... *B01D 53/1425* (2013.01); *B01D 53/1406* (2013.01); *B01D 53/1475* (2013.01);
(Continued)

(58) Field of Classification Search
CPC .............. B01D 19/0031; B01D 2252/102; B01D 2252/1035; B01D 2252/20484; B01D 2257/504; B01D 53/002; B01D 53/1406; B01D 53/1425; B01D 53/1475; C02F 1/008; C02F 1/445; C02F 2103/08; Y02C 10/06
See application file for complete search history.

(56) References Cited

U.S. PATENT DOCUMENTS

2009/0001020 A1* 1/2009 Constantz ............ B01D 61/025
210/652
2009/0308727 A1 12/2009 Kirts
(Continued)

FOREIGN PATENT DOCUMENTS

| KR | 10-1020316 B1 | 3/2011 |
|---|---|---|
| KR | 10-1026566 B1 | 3/2011 |
| WO | 01-96243 A1 | 12/2001 |

*Primary Examiner* — Duane Smith
*Assistant Examiner* — Adam W Bergfelder
(74) *Attorney, Agent, or Firm* — Finch & Maloney PLLC (57) ABSTRACT

The present invention relates to an apparatus for integrating carbon dioxide capture and desalination. The apparatus includes an absorption unit absorbing carbon dioxide included in a flue gas by bringing the flue gas into contact with an absorption solution in which a volatile absorbent absorbing carbon dioxide is dissolved, a draw solution chamber storing the absorption solution supplied from the absorption and using the absorption solution as a draw solution, a forward osmosis separator separating fresh water from raw water by a forward osmosis method using the draw solution flowing in from the draw solution chamber, a buffer chamber fluidly connected to the draw solution chamber supplied with a portion of the diluted draw solution that has passed through the forward osmosis separator, a fresh water separating unit separating fresh water from the diluted draw solution that has passed through the forward osmosis separator, a carbon dioxide separating unit separating carbon dioxide from the draw solution supplied from the buffer chamber, and a control unit controlling concentrations and amounts of the draw solutions stored in the draw solution chamber and the buffer chamber.

20 Claims, 8 Drawing Sheets

(51) Int. Cl.
 *B01D 53/18* (2006.01)
 *C02F 1/00* (2006.01)
 *C02F 103/08* (2006.01)

(52) U.S. Cl.
 CPC ............... *C02F1/445* (2013.01); *B01D 53/18* (2013.01); *B01D 2252/102* (2013.01); *B01D 2252/1035* (2013.01); *B01D 2252/20484* (2013.01); *B01D 2257/504* (2013.01); *C02F 1/008* (2013.01); *C02F 2103/08* (2013.01); *Y02C 10/06* (2013.01)

(56) References Cited

U.S. PATENT DOCUMENTS

| | | | |
|---|---|---|---|
| 2011/0100218 A1* | 5/2011 | Wolfe | B01D 53/1493 95/205 |
| 2012/0211421 A1* | 8/2012 | Self | B01D 53/62 210/640 |
| 2012/0273417 A1* | 11/2012 | McGinnis | B01D 61/002 210/637 |
| 2015/0232351 A1* | 8/2015 | McGinnis | C02F 1/447 210/640 |

\* cited by examiner

COMBINED CARBON DIOXIDE CAPTURE AND DESALINATION DEVICE

This application is a National Stage Entry of International Application PCT/KR2012/009891 (filed 21 Nov. 2012), which claims priority to Republic of Korea Patent Application 10-2011-0122451 (filed 22 Nov. 2011).

TECHNICAL FIELD

The present invention relates to an apparatus for integrating carbon dioxide capture and desalination, and more particularly, to an apparatus for integrating a carbon dioxide-capture function using a volatile or non-volatile absorbent and a desalination function using a forward osmosis method.

BACKGROUND ART

Recently, various researches have been performed to solve an accelerated global warming. In particular, carbon dioxide among greenhouse gases blamed for the global warming is generated in great quantities by the use of fossil fuels such as coal and oil. A technique that isolates the carbon dioxide from the atmosphere is called a carbon dioxide capture & storage (CCS) technique. The CCS techniques may be categorized as any one of a post-combustion capture technique, a pre-combustion capture technique, and an oxyfuel combustion technique. The post-combustion capture technique may be easily applied to a conventional art and may be the closest to commercialization.

Various researches have also been conducted for a desalination technique to solve a lack of drinking water caused by water pollution or drought. The desalination technique may use an evaporation method, a reverse osmosis (RO) method, a crystal method, an electrodialysis method, or a forward osmosis method. Recently, the forward osmosis method using a natural osmotic pressure difference has been highlighted to reduce energy necessary for the desalination.

The carbon dioxide-capture apparatus has been installed separately from the desalination apparatus, and there was no attempt to integrate the two apparatuses. In the case that the carbon dioxide-capture apparatus is installed separately from the desalination apparatus, a total installation cost of the two apparatuses increases and energy required for operating the two apparatuses increases. In addition, the amount of a necessary fluid circulating through the inside of each apparatus is great. In particular, in a power plant or an offshore plant, carbon dioxide is generated in great quantities and water for power and drinking water should be secured. Thus, the carbon dioxide-capture apparatus and the desalination apparatus are essential to the power plant or the offshore plant.

As a result, to reduce installation costs and energy, it is required to develop a technique capable of integrating the carbon dioxide-capture apparatus and the desalination apparatus in one apparatus.

DISCLOSURE OF THE INVENTION

Technical Problem

The present invention provides an apparatus for integrating both a carbon dioxide-capture function and a desalination function.

Technical Solution

According to an embodiment of the present invention, an apparatus may include: an absorption unit absorbing carbon dioxide included in a flue gas by bringing the flue gas into contact with an absorption solution in which a volatile absorbent absorbing carbon dioxide is dissolved; a draw solution chamber storing the absorption solution that flows in from the absorption unit, the draw solution chamber using the absorption solution as a draw solution; a forward osmosis separator separating fresh water from raw water by a forward osmosis method using the draw solution flowing in from the draw solution chamber; a buffer chamber fluidly connected to the draw solution chamber, the draw solution passing through the forward osmosis separator to become a diluted draw solution, and a portion of the diluted draw solution flowing into the buffer chamber; a fresh water separating unit separating fresh water from the diluted draw solution that has passed through the forward osmosis separator; a carbon dioxide separating unit separating carbon dioxide from the draw solution supplied from the buffer chamber, the carbon dioxide separating unit fluidly connected to the absorption unit such that the draw solution, from which the carbon dioxide is separated, flows into the absorption unit so as to be reused as the absorption solution; and a control unit controlling concentrations and amounts of the draw solutions stored in the draw solution chamber and the buffer chamber. A portion of the carbon dioxide separated in the carbon dioxide separating unit flows into the draw solution chamber.

The apparatus may further include: a diluted-draw solution chamber disposed between the forward osmosis separator and the fresh water separating unit and storing the diluted draw solution supplied from the forward osmosis separator, the diluted-draw solution chamber supplying a draw solution to the fresh water separating unit and the buffer chamber. The control unit may control the amount of the draw solution supplied from the diluted-draw solution chamber to the buffer chamber.

The apparatus may further include: a condenser condensing only vapor among gas-phase materials that are separated from the fresh water by the fresh water separating unit. Water condensed in the condenser may flow into the fresh water separating unit.

The fresh water separating unit may include a first membrane contactor that separates a gas-phase material dissolved in the draw solution.

The apparatus may further include: a solid-phase material capture chamber capturing a solid-phase material generated by cooling the gas-phase material flowing in from the first membrane contactor. A portion of the diluted draw solution supplied from the forward osmosis separator may flow into the solid-phase material capture chamber, and the solid-phase material may be dissolved in the draw solution in the solid-phase material capture chamber and may then flow into the buffer chamber.

The gas-phase material in the solid-phase material capture chamber may flow into the carbon dioxide separating unit.

The apparatus may further include: a second membrane contactor dissolving the gas-phase material flowing in from the solid-phase material capture chamber in a draw solution; a concentrated-draw solution chamber storing the draw solution flowing out from the second membrane contactor; and a circulating pump supplying a portion of the draw solution stored in the concentrated-draw solution chamber into the second membrane contactor. The draw solution remaining in the concentrated-draw solution chamber may be supplied into the buffer chamber.

The fresh water separating unit may include a separation tower that separates a gas-phase material, which is dissolved in the diluted draw solution passing through the forward osmosis separator, by using a partial pressure difference.

The apparatus may further include: a first cleaning tower dissolving the volatile absorbent, which is included in a gas-phase material flowing in from the absorption unit, in the draw solution; and a second cleaning tower dissolving the volatile absorbent, which is included in a gas-phase material flowing in from the carbon dioxide separating unit, in the draw solution.

The apparatus may further include: a concentration tower into which the draw solutions including the volatile absorbent flow from the first and second cleaning towers. A gas-phase volatile absorbent existing in the concentration tower may flow into the carbon dioxide separating unit, and the draw solution existing in the concentration tower may flow again into the first and second cleaning towers to repeatedly dissolve the volatile absorbent existing in the first and second cleaning towers.

A portion of the fresh water separated in the fresh water separating unit may flow into the first and second cleaning towers to dissolve portions of the volatile absorbent and then flows into the fresh water separating unit.

A portion of the carbon dioxide separated in the carbon dioxide separating unit may be absorbed in the fresh water separated in the fresh water separating unit so as to be used in a post-treatment process of the fresh water.

The volatile absorbent may include ammonia (NH3).

According to another embodiment of the present invention, an apparatus may include: an absorption unit absorbing carbon dioxide included in a flue gas by bringing the flue gas into contact with an absorption solution in which a non-volatile absorbent absorbing carbon dioxide is dissolved; a draw solution chamber storing the absorption solution that flows in from the absorption unit, the draw solution chamber using the absorption solution as a draw solution; a forward osmosis separator separating fresh water from raw water by a forward osmosis method using the draw solution flowing in from the draw solution chamber; a buffer chamber fluidly connected to the draw solution chamber, the draw solution passing through the forward osmosis separator to become a diluted draw solution, and a portion of the diluted draw solution flowing into the buffer chamber; a first separating unit separating a gas-phase material from the diluted draw solution that has passed through the forward osmosis separator, the first separating unit fluidly connected to the buffer chamber such that a draw solution concentrated by separating the gas-phase material flows into the buffer chamber; a second separating unit separating carbon dioxide from the gas-phase material flowing in from the first separating unit to obtain fresh water; and a control unit controlling concentrations and amounts of the draw solutions stored in the draw solution chamber and the buffer chamber. A portion of the carbon dioxide separated in the second separating unit flows into the draw solution chamber.

The apparatus may further include: a diluted-draw solution chamber disposed between the forward osmosis separator and the first separating unit and storing the diluted draw solution supplied from the forward osmosis separator, the diluted-draw solution chamber supplying a draw solution to the first separating unit and the buffer chamber. The control unit may control the amount of the draw solution supplied from the diluted-draw solution chamber to the buffer chamber.

The second separating unit may include: a condenser condensing only vapor of the gas-phase material supplied from the first separating unit to make fresh water.

The first separating unit may include a membrane contactor.

The first separating unit may include a separation tower that separates the gas-phase material from the diluted draw solution passing through the forward osmosis separator using a partial pressure difference by heating.

A portion of the draw solution stored in the buffer chamber may flow into the absorption unit to act as the absorption solution absorbing carbon dioxide.

The apparatus may further include: a carbon dioxide separating unit separating carbon dioxide from the draw solution supplied from the buffer chamber. The carbon dioxide separating unit may be fluidly connected to the absorption unit such that the draw solution, from which the carbon dioxide is separated, flows into the absorption unit so as to be reused as the absorption solution.

The apparatus may further include: an absorption solution concentration adjusting chamber disposed between the absorption unit and the carbon dioxide separating unit. A portion of the draw solution separated from the gas-phase material in the first separating unit may flow into the absorption solution concentration adjusting chamber.

A portion of the carbon dioxide separated in the second separating unit may be absorbed in the fresh water separated in the second separating unit so as to be used in a post-treatment process of the fresh water.

The non-volatile absorbent may include an amine-based absorbent.

The non-volatile absorbent may include monoethanolamine (MEA).

Advantageous Effects

The apparatus according to the present invention integrates the carbon dioxide capture function and the desalination function to reduce installation costs, energy, and amounts of working fluids of the apparatus.

BEST MODE FOR CARRYING OUT THE INVENTION

Hereinafter, embodiments of the present invention will be described in detail with reference to the accompanying drawings.

Figure 1:
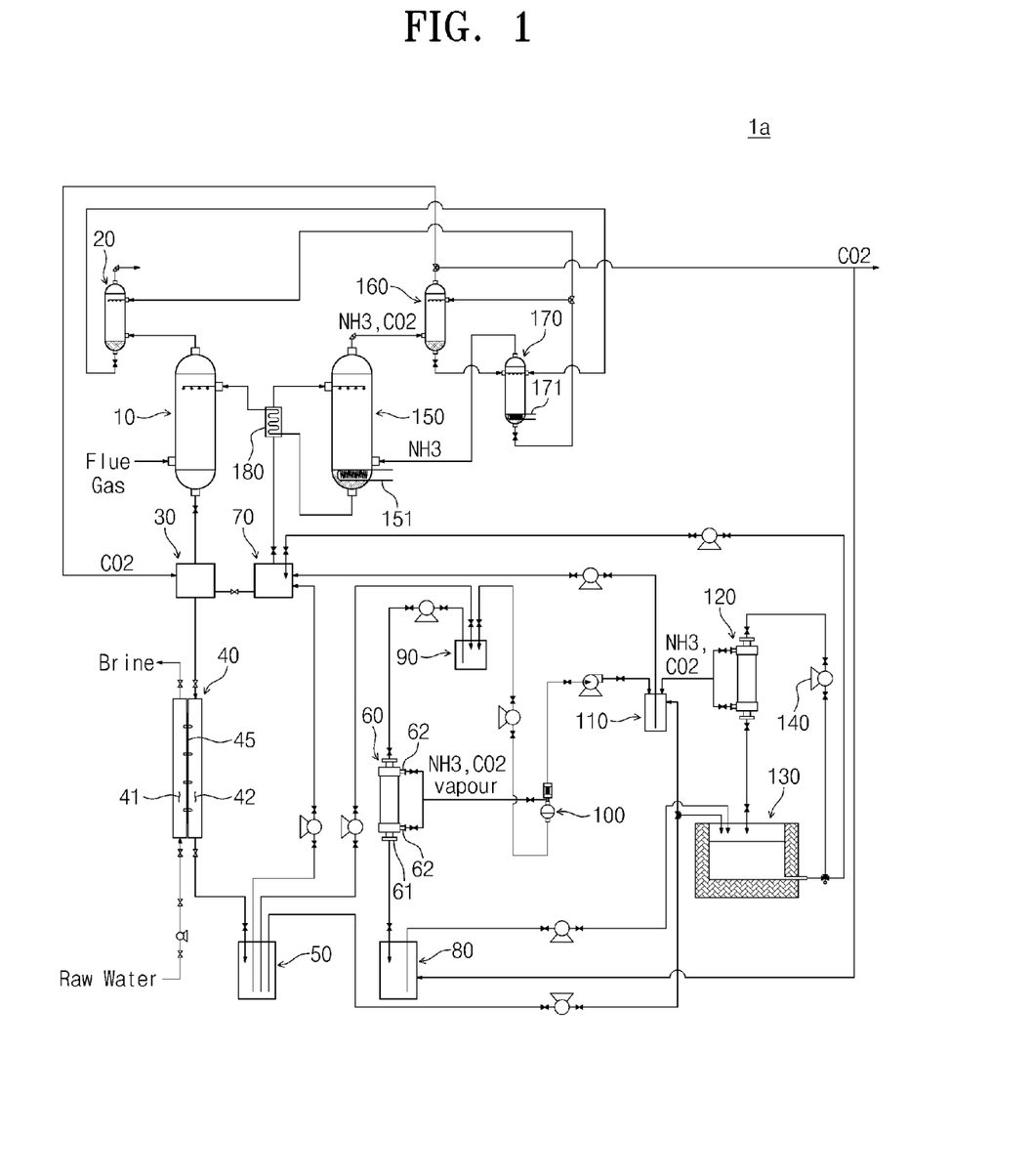
FIG. 1 schematically shows an apparatus for integrating carbon dioxide capture and desalination according to a first embodiment of the present invention.

FIG. 1 schematically shows an apparatus 1a for integrating carbon dioxide capture and desalination according to a first embodiment of the present invention.

A flue gas that is generated in a power plant or an offshore plant flows into an absorption unit 10. The flue gas includes the great amount of carbon dioxide.

The absorption unit 10 absorbs the carbon dioxide included in the flue gas by bringing an absorption solution into contact with the flue gas. An absorbent that absorbs the carbon dioxide is dissolved in the absorption solution. In the present embodiment, the absorption unit 10 may have an absorption tower shape.

The absorbent used in the present embodiment is ammonia ($NH_3$) having volatility. Here, the ammonia and the carbon dioxide may be dissolved in water so as to be converted into $NH_4^+$ ions and $CO_3^{2-}$ ions, so a concentration of a solution in which the ammonia and the carbon dioxide are dissolved may be increased to make an osmotic pressure gradient. This means that the absorption solution used in the absorption unit 10 is used as a draw solution that induces an osmotic pressure phenomenon. This feature is used to realize an apparatus for integrating a carbon dioxide-capture apparatus and a desalination apparatus using a forward Osmosis method.

The ammonia is an example of the absorbent. In other embodiments, various materials capable of absorbing the carbon dioxide and of dissolving in water to make the osmotic pressure gradient may be used as the absorbent.

The flue gas, from which the carbon dioxide is removed in the absorption unit 10, flows into a first cleaning tower 20. Since the ammonia used as the absorbent in the absorption unit 10 has the volatility, a portion of the ammonia may flow into the first cleaning tower 20.

The first cleaning tower 20 dissolves the ammonia included in a gaseous material (i.e., the slight ammonia and the flue gas from which the carbon dioxide is removed) flowing in from the absorption unit 10 in a draw solution. Since the ammonia is dissolved easily in water, most of the ammonia may be dissolved by the draw solution supplied through an upper part of the first cleaning tower 20. As a result, the carbon dioxide may be removed from the flue gas while the flue gas passes through the absorption unit 10 and the first cleaning tower 20 and then the flue gas may be exhausted to the outside. However, the first cleaning tower may be omitted if necessary. The draw solution, which dissolves the ammonia within the first cleaning tower 20, flows in from a concentration tower 170, as described below.

The absorption solution which absorbs the carbon dioxide in the absorption unit 10 flows into a draw solution chamber 30. As described above, the absorption solution stored in draw solution chamber 30 may act as the draw solution which induces the osmotic pressure phenomenon. Hereinafter, a solution flowing out from the draw solution chamber 30 is referred to as the draw solution.

A forward osmosis separator 40 separates fresh water from raw water using the draw solution flowing in from the draw solution chamber 30 by the forward osmosis method. To achieve this, the forward osmosis separator 40 includes a semipermeable membrane 45 having selective permeability. A solvent permeates the semipermeable membrane 45 but a solute does not permeate the semipermeable membrane 45. A first space 41, through which the raw water passes, is separated from a second space 42, through which the draw solution passes, by the semipermeable membrane 45. The raw water passing through the first space 41 may be, for example, seawater, brackish water, wastewater, or contaminated water. As mentioned above, since a concentration of the draw solution passing through the second space is high, only a solution (i.e., the fresh water) is moved from the raw water of the first space into the second space 42 by the osmotic pressure phenomenon. Thus, only the fresh water may be separated from the raw water. The raw water passing through the forward osmosis separator 40 becomes brine to be exhausted to the outside.

Since the draw solution passing through the forward osmosis separator 40 includes the fresh water moved from the raw water, the concentration of the draw solution is reduced. The draw solution diluted by the reduction of its concentration flows into a diluted-draw solution chamber 50.

The diluted-draw solution chamber 50 stores the diluted draw solution flowing in from the forward osmosis separator 40. The diluted draw solution stored in the diluted-draw solution chamber 50 may be supplied to a first membrane contactor 60 and a buffer chamber 70.

The first membrane contactor 60 acts as a fresh water separating unit that separates fresh water from the diluted draw solution that has passed through the forward osmosis separator 40. A membrane contactor is a device that separates a liquid-phase material and a gas-phase material from a solution or dissolves a gas-phase material in a solution. Since the membrane contactor is easily apparent to those skilled in the art, the detail description thereto is omitted. For example, the membrane contactor may be referred to Korean Patent registration No. 10-1020316B.

In the present embodiment, the first membrane contactor 60 may separate a gas-phase material dissolved in the draw solution. In other words, if the draw solution passes through the first membrane contactor 60, only the fresh water corresponding to the liquid-phase material is outputted through a first outlet 61, and the ammonia, the carbon dioxide, and vapor, which correspond to the gas-phase materials, are outputted through a second outlet 62.

A heating chamber 90 may be installed between the diluted-draw solution chamber 50 and the first membrane contactor 60. The heating chamber 90 heats the draw solution stored in the heating chamber 90 to a temperature at which the first membrane contactor 60 is operated under the most suitable condition, thereby increasing desalination efficiency. However, the heating chamber 90 may be omitted if necessary.

The fresh water outputted through the first outlet 61 of the first membrane contactor 60 may be stored in a fresh water chamber 80 so as to be supplied to a place where the fresh water is required. The gas-phase materials (i.e., the ammonia, the carbon dioxide, and the vapor) outputted through the second outlet 62 flows into a condenser 100.

The fresh water stored in the fresh water chamber 80 may be used as drinking water or another use through a post-treatment process. The post-treatment process means a process that properly adjusts pH or hardness of the fresh water stored in the fresh water chamber 80. Generally, the post-treatment process includes a carbon dioxide absorption process, a remineralization process, and a carbon dioxide exhaust process. The carbon dioxide absorption process excessively supplies carbon dioxide into the fresh water, so the carbon dioxide is absorbed into the fresh water. In remineralization process, the fresh water in which the carbon dioxide is absorbed passes through a limestone filter in which limestone is filled, thereby forming calcium ions ($Ca^{2+}$) and bicarbonate ions ($HCO3^-$). The carbon dioxide exhaust process exhausts the carbon dioxide, which exists in the fresh water after the remineralization process, from the fresh water.

The carbon dioxide absorbed in the fresh water by the carbon dioxide absorption process reacts with the limestone having $CaCO_3$ as a main ingredient while passing through the limestone filter in the remineralization process, thereby forming the calcium ions ($Ca^{2+}$) and the bicarbonate ions ($HCO3^-$). The pH and the hardness of the fresh water may be adjusted by the calcium ions ($Ca^{2+}$) and the bicarbonate ions ($HCO3^-$), so the fresh water may be used as the drinking water.

The condenser 100 condenses only the vapor among the gas-phase materials flowing into the condenser 100. Water condensed in condenser 100 flows again into the first membrane contactor 60 through the heating chamber 60. At this time, a portion of the gas-phase materials (i.e., the ammonia, the carbon dioxide, and the vapor) may be dissolved when the vapor outputted from the first membrane contactor 60 is condensed into the water. Thus, if the condensed water is inputted again into the first membrane contactor 60 so as to be re-circulated, the desalination efficiency may be improved.

The gas-phase materials outputted from the first membrane contactor 60 may be naturally cooled while passing through a pipe, so a solid-phase material may be generated. The gas-phase ammonia may react with the carbon dioxide and the vapor at a temperature of about 60° C. or less so as to be changed into a solid-phase ammonium bicarbonate. If the solid-phase ammonium bicarbonate is generated, a recovery rate of the draw solution may be reduced and the pipe may be clogged. To prevent these problems, the vapor is removed in the condenser 100. However, since the gas-phase materials (i.e., the ammonia and the carbon dioxide) may react with non-removed vapor to continuously generate the solid-phase ammonium bicarbonate, a solid-phase material capture chamber 110 may be installed to capture the solid-phase ammonium bicarbonate.

If the solid-phase material is generated, it is dissolved in the draw solution within the solid-phase material capture chamber 110 and then flows into the buffer chamber 70. The solid-phase material capture chamber 110 may be fluidly connected to the diluted-draw solution chamber 50, so a portion of the diluted draw solution passing through the forward osmosis separator 40 may flow in the solid-phase material capture chamber 110. A heater or a stirring device may be installed in the solid-phase material capture chamber 110 to assist the dissolution of the solid-phase material.

The gas-phase materials (i.e., the ammonia and the carbon dioxide) in the solid-phase material capture chamber 110 flow into a second membrane contactor 120. The second membrane contactor 120 is operated contrary to the first membrane contactor 60 described above. In other words, the gas-phase materials inputted from the solid-phase material capture chamber 110 is dissolved in the draw solution flowing within the second membrane contactor 120. Thus, the concentration of the draw solution may be increased.

The draw solution having the increased concentration is outputted from the second membrane contactor 120 and is then stored in a concentrated-draw solution chamber 130.

A circulating pump 140 inputs a portion of the draw solution stored in the concentrated-draw solution chamber 130 into the second membrane contactor 120.

Since a portion of the draw solution in the concentrated-draw solution chamber 130 is continuously circulated through the circulating pump 140 and the second membrane contactor 120, the concentration of the draw solution stored in the concentrated-draw solution chamber 130 may be maintained at a certain level. In addition, to adjust the concentration of the draw solution stored in the concentrated-draw solution chamber 130, the fresh water may be supplied from the fresh water or the diluted draw solution may be supplied from the diluted-draw solution chamber 50. The draw solution having the concentration increased in the concentrated-draw solution chamber 130 is supplied into the buffer chamber 70.

As described above, the draw solution flows from the diluted-draw solution chamber 50, the solid-phase material capture chamber 110, and the concentrated-draw solution chamber 130 into the buffer chamber 70. Here, a portion of the draw solution stored in the diluted-draw solution chamber 50 does not pass through the first membrane contactor 60 and the concentrated-draw solution chamber 130 but directly flows into the buffer chamber 70. If the draw solution stored in the diluted-draw solution chamber 50 passes through the first membrane contactor 60 and the concentrated-draw solution chamber 130, great amounts of energy are consumed when the concentration of the draw solution is increased by the second membrane contactor 120. In addition, the draw solution required during the forward osmosis process should be reproduced using the fresh water. Thus, efficiency of an apparatus may be deteriorated.

In the present embodiment, the portion of the draw solution stored in the diluted-draw solution chamber 50 may directly flow into the buffer chamber 70, thereby preventing the excessive energy consumption. However, if an excessive amount of the draw solution directly flows into the buffer chamber 70, a generation amount of the fresh water separated in the fresh water separating unit 60 is reduced. Thus, a suitable amount of the draw solution should directly flow into the buffer chamber 70. As a result of a plurality of experiments, the amount of the draw solution supplied from the diluted-draw solution chamber 50 into the buffer chamber 70 may be in a range of 10% to 40% of the amount of the draw solution supplied from the diluted-draw solution chamber 50 into the fresh water separating unit 60. However, this ratio may be varied according to efficiency improvement of the forward osmosis process, so a control unit may vary the amount of the draw solution supplied from the diluted-draw solution chamber 50 into the buffer chamber 70 according to a working condition of the apparatus 1*a* for integrating the carbon dioxide capture and the desalination.

A portion of the draw solution stored in the buffer chamber 70 flows into a carbon dioxide separating unit 150.

The carbon dioxide separating unit 150 separates carbon dioxide from the draw solution supplied from the buffer chamber 70. In the present embodiment, the carbon dioxide separating unit 150 may have a regeneration tower shape. In other words, the ammonia and the carbon dioxide are evaporated by a heater 151 installed in the carbon dioxide separating unit 150, and the evaporated ammonia and carbon dioxide are outputted from the carbon dioxide separating unit 150 to flow into a second cleaning tower 160.

The second cleaning tower 160 dissolves the ammonia included in the gas-phase materials (i.e., the carbon dioxide and a portion of the ammonia) in a draw solution. Since the ammonia is dissolved easily in water, most of the ammonia may be dissolved by the draw solution supplied through an upper part of the second cleaning tower 160. As a result, only the carbon dioxide may be exhausted from the second cleaning tower 160 and may be captured. As described below, the draw solution which dissolves the ammonia within the second cleaning tower 160 is supplied from the concentration tower 170.

A portion of the carbon dioxide exhausted from the carbon dioxide separating unit 150 may flow into the draw solution chamber 30 through the second cleaning tower 160 so as to be used for adjusting the concentration of the draw solution stored in the draw solution chamber 30.

In addition, a portion of the carbon dioxide exhausted from the carbon dioxide separating unit 150 may flow into the fresh water chamber 80 through the second cleaning tower 160 so as to be absorbed into the fresh water. This means that the portion of the carbon dioxide exhausted from the carbon dioxide separating unit 150 is used during the carbon dioxide absorption process of the post-treatment processes of the fresh water. As mentioned above, the carbon dioxide absorption process excessively supplying the carbon dioxide should be performed to dissolve the carbon dioxide into the fresh water when the fresh water stored in the fresh water chamber 80 is treated by the post-treatment processes. To achieve this, a general desalination apparatus includes an additional carbon dioxide producing apparatus that generates carbon dioxide. In the present embodiment, because the carbon dioxide capture apparatus and the desalination apparatus are integrated in one apparatus, the carbon dioxide exhausted from the second cleaning tower 160 may be used in the post-treatment processes (in particular, the carbon dioxide absorption process) of the fresh water without an additional carbon dioxide producing apparatus.

Meanwhile, the carbon dioxide separating unit 150 may be fluidly connected to the absorption unit 10. Thus, the draw solution, from which the carbon dioxide is separated in the carbon dioxide separating unit 150, flows again into the absorption unit 10 so as to be reused as the absorption solution absorbing the carbon dioxide.

The draw solution outputted from the carbon dioxide separating unit 150 toward the absorption unit 10 may have a relatively high-temperature, and the draw solution outputted from the buffer chamber 70 toward the carbon dioxide separating unit 150 may have a relatively low-temperature. The relatively high-temperature draw solution and the relatively low-temperature draw solution pass through a heat exchanger 180, so heat exchange between the two solutions may occur. Energy consumption of the heater 151 of the carbon dioxide separating unit 150 may be reduced by the heat exchange.

The draw solutions, in which the ammonia is dissolved, flow from the first and second cleaning towers 20 and 160 into the concentration tower 170. A heater 171 may be installed at the concentration tower 170. Gas-phase ammonia evaporated by the heater 171 flows again into the carbon dioxide separating unit 150. In addition, the draw solution existing in the concentration tower 170 flows again into the first and second cleaning towers 20 and 160 so as to repeatedly dissolve the gas-phase ammonia existing in the first and second cleaning towers 20 and 160.

The control unit (not shown) controls the amounts and the concentrations of the draw solutions stored in the draw solution chamber 30 and the buffer chamber 70. For example, the control unit may control a valve or pump between the draw solution chamber 30 and the absorption unit 10, a valve or pump between the draw solution chamber 30 and the forward osmosis separator 40, a valve or pump between the draw solution chamber 30 and the buffer chamber 70, and a valve or pump between the draw solution chamber 30 and the second cleaning tower 160, thereby controlling the concentration and the amount of the draw solution stored in the draw solution chamber 30. The control unit may control a valve or pump between the buffer chamber 70 and the diluted-draw solution chamber 50, a valve or pump between the buffer chamber 70 and the solid-phase material capture chamber 110, a valve or pump between the buffer chamber 70 and the concentrated-draw solution chamber 130, a valve or pump between the buffer chamber 70 and the carbon dioxide separating unit 150, and a valve or pump between the buffer chamber 70 and the draw solution chamber 30, thereby controlling the concentration and the amount of the draw solution stored in the buffer chamber 70.

Since the amounts and the concentrations of the draw solutions stored in the draw solution chamber 30 and the buffer chamber 70 are controlled, the carbon dioxide capture process and the desalination process may be continuously performed. In addition, even though external factors occur, these may be suitably managed.

One notable feature is that a portion of the carbon dioxide exhausted from the carbon dioxide separating unit 150 may flow into the draw solution chamber 30 through the second cleaning tower 160 so as to control the concentration of the draw solution stored in the draw solution chamber 30. Thus, the concentration of the draw solution stored in the draw solution chamber 30 may be more finely controlled.

Another notable feature is that a portion of the carbon dioxide exhausted from the carbon dioxide separating unit 150 passes through the second cleaning tower 160 and is then used during the post-treatment process (e.g., the carbon dioxide absorption process) of the fresh water. In other words, a portion of the carbon dioxide exhausted from the second cleaning tower 160 is absorbed into the fresh water outputted from the first membrane contactor 60, and thus, the carbon dioxide absorption process of the post-treatment processes of the fresh water may be performed without an additional carbon dioxide producing apparatus.

In the present embodiment, the carbon dioxide capture apparatus and the desalination apparatus are integrated into one apparatus. Thus, it is possible to reduce installation costs of the apparatus according to the present embodiment as compared to those of an apparatus including a carbon dioxide capture apparatus and a desalination apparatus which are independent of each other. In addition, it is possible to reduce energy and the amounts of working fluids which are required in the carbon dioxide capture process and the desalination process.

Figure 2:
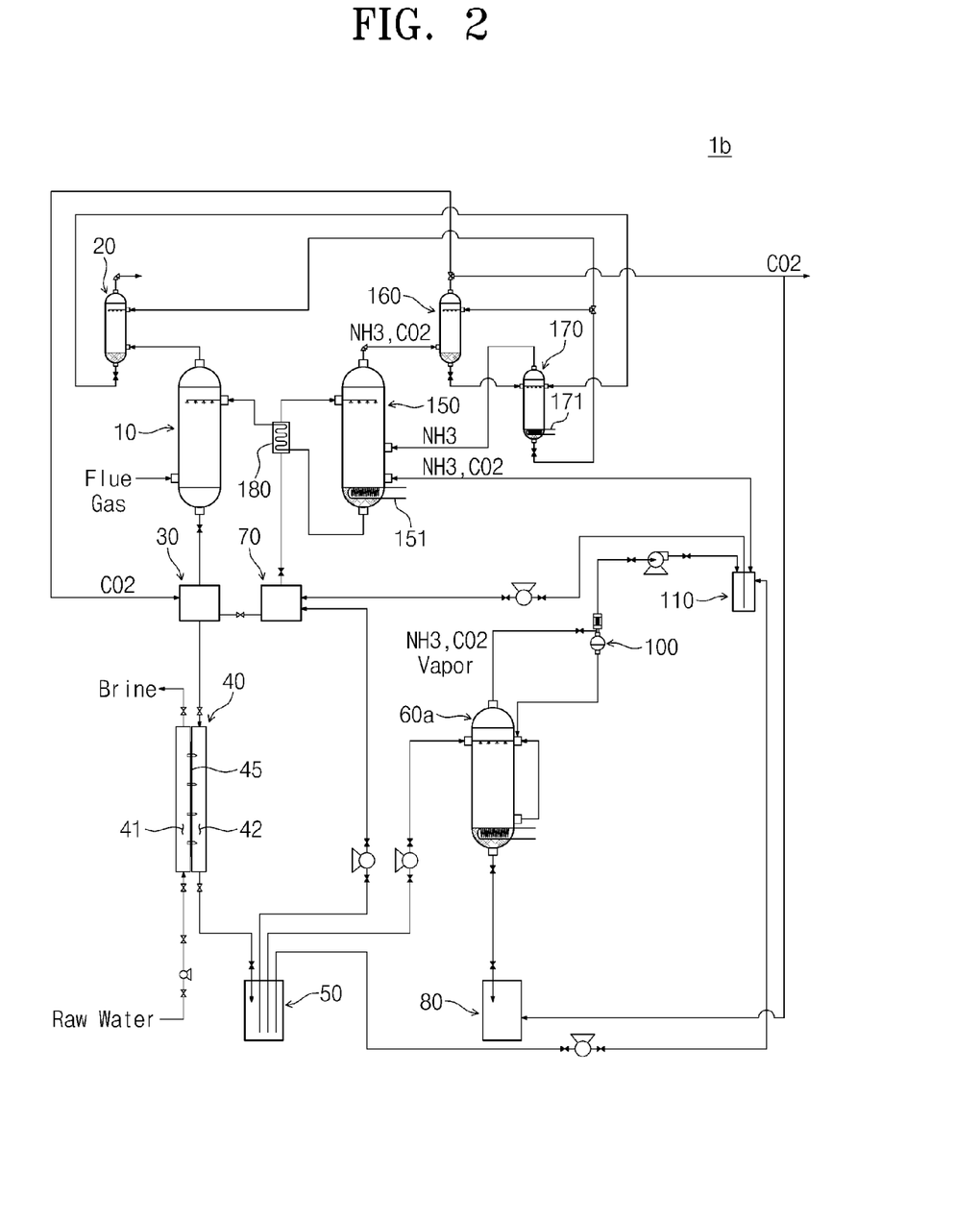
FIG. 2 schematically shows an apparatus for integrating carbon dioxide capture and desalination according to a second embodiment of the present invention.

FIG. 2 schematically shows an apparatus 1b for integrating carbon dioxide capture and desalination according to a second embodiment of the present invention. In the present embodiment, the same elements as described in the embodiment described above will be indicated by the same reference numbers or the same reference designators, and the detail descriptions thereto will be omitted.

In the second embodiment, a separation tower 60a, instead of the first membrane contactor 60 of the first embodiment, acts as the fresh water separating unit which separates the fresh water from the diluted draw solution passing through the forward osmosis separator 40. The separation tower 60a separates the gas-phase materials (i.e., the ammonia, the carbon dioxide, and the vapor) dissolving in the draw solution supplied from the diluted-draw solution chamber 50 by using a partial pressure difference. To achieve this, a heater for heating the draw solution may be installed at the separation tower 60a, or the inside of the separation tower 60a may be decompressed. The pressure of the inside of the separation tower 60a may become close to a vacuum pressure when the inside of the separation tower 60a is decompressed. A portion of the vapor, the ammonia, and the carbon dioxide, which are included in the draw solution, are converted into gas-phase materials, and the gas-phase materials flow out from the separation tower 60a. The gas-phase materials flowing out from the separation tower 60a pass through the condenser 100 and then flow into the solid-phase material capture chamber 110. Meanwhile, the draw solution remaining in a lower portion of the separation tower 60a becomes fresh water, and the fresh water is supplied into the fresh water chamber 80.

The condenser 100 is disposed between the separation tower 60a and the solid-phase material capture chamber 110. The condenser 100 condenses only the vapor among the gas-phase materials supplied into the condenser 100. Water condensed in the condenser 100 flows again into the separation tower 60a. The gas-phase materials (i.e., the ammonia and the carbon dioxide) may be partially dissolved when the vapor outputted from the separation tower 60a is condensed to become the water. The condensed water flows again into the separation tower 60a so as to be re-circulated, so the desalination efficiency may be improved.

The gas-phase materials (i.e., the ammonia and the carbon dioxide) in the solid-phase material capture chamber 110 flow into the carbon dioxide separating unit 150.

In comparison to the first embodiment, the separation tower 60a is used in the present embodiment to simplify components of the apparatus 1b for integrating carbon dioxide capture and desalination.

Figure 3:
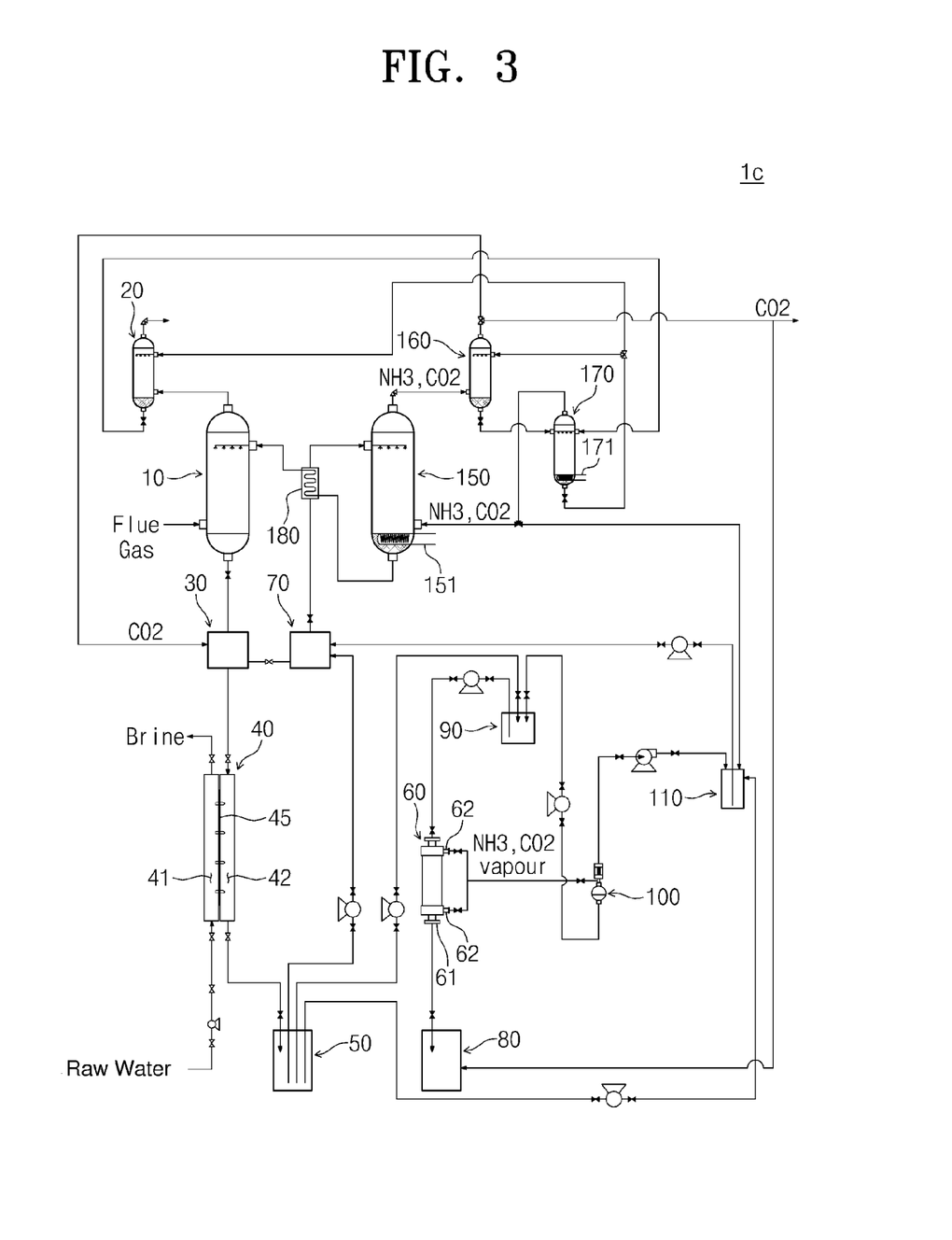
FIG. 3 schematically shows an apparatus for integrating carbon dioxide capture and desalination according to a third embodiment of the present invention.

FIG. 3 schematically shows an apparatus 1c for integrating carbon dioxide capture and desalination according to a third embodiment of the present invention. In the present embodiment, the same elements as described in the embodiments described above will be indicated by the same reference numbers or the same reference designators, and the detail descriptions thereto will be omitted.

The present embodiment is similar to the first embodiment. However, the second membrane contactor 120, the concentrated-draw solution chamber 130, and the circulating pump 140 used in the first embodiment are omitted in the present embodiment.

The gas-phase materials (i.e., the ammonia and the carbon dioxide) in the solid-phase material capture chamber 110 flow into the second membrane contactor 120 in the first embodiment. On the contrary, in the present embodiment, the gas-phase materials (i.e., the ammonia and the carbon dioxide) in the solid-phase material capture chamber 110 directly flow into the carbon dioxide separating unit 150.

In comparison to the first embodiment, the second membrane contactor 120, the concentrated-draw solution chamber 130, and the circulating pump 140 are omitted in the present embodiment. Thus, components of the apparatus 1c are simplified.

Figure 4:
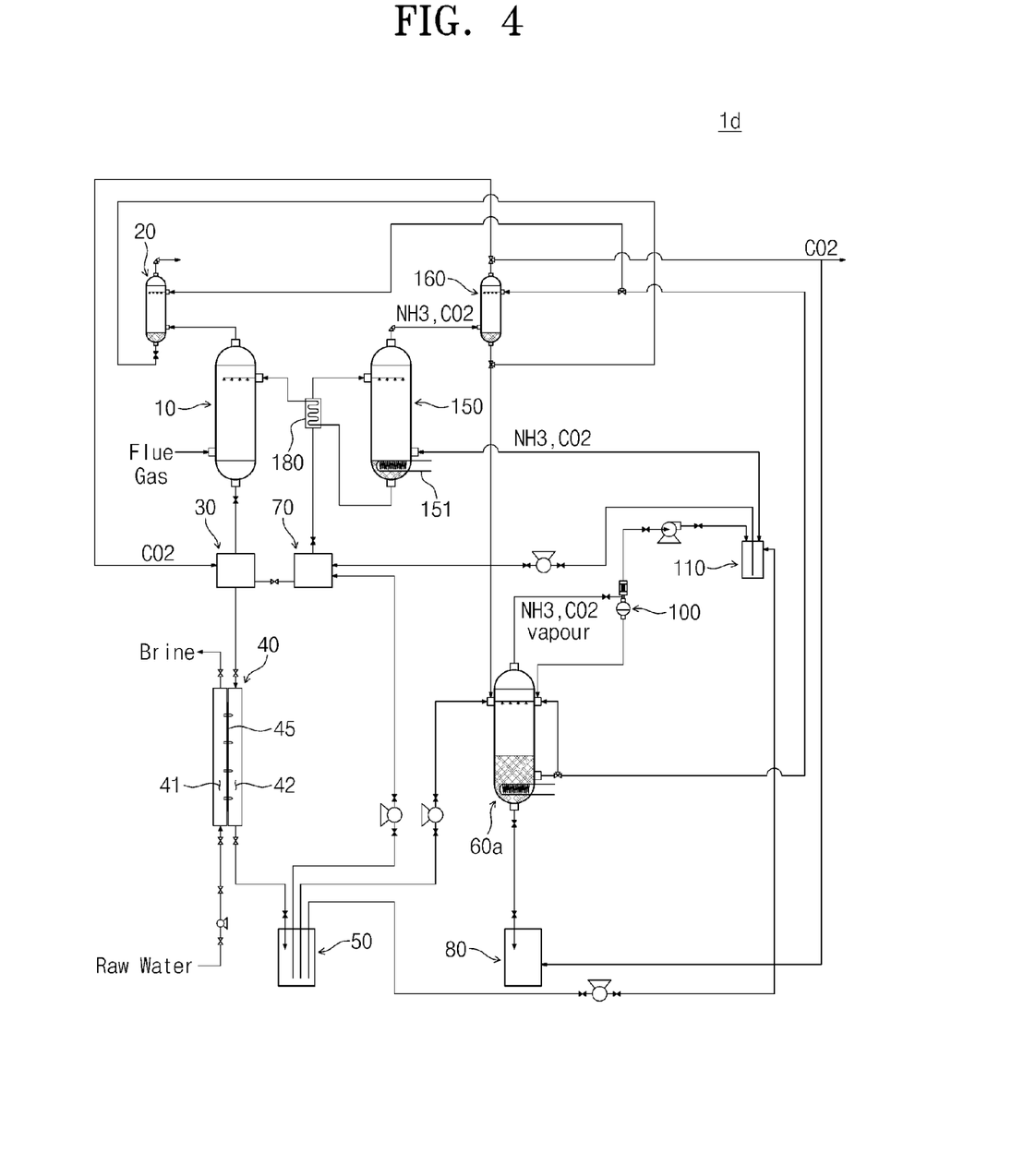
FIG. 4 schematically shows an apparatus for integrating carbon dioxide capture and desalination according to a fourth embodiment of the present invention.

FIG. 4 schematically shows an apparatus 1d for integrating carbon dioxide capture and desalination according to a fourth embodiment of the present invention. In the present embodiment, the same elements as described in the embodiments described above will be indicated by the same reference numbers or the same reference designators, and the detail descriptions thereto will be omitted.

The present embodiment is similar to the second embodiment. However, the concentration tower 170 used in the second embodiment is omitted in the present embodiment. In the present embodiment, a portion of the fresh water separated in the separation tower 60a flows into the first and second cleaning towers 20 and 160 to absorb the ammonia. The fresh water absorbing the ammonia flows again into the separation tower 60a.

In comparison to the second embodiment, the concentration tower 170 is omitted in the present embodiment, so components of the apparatus 1d are simplified.

Figure 5:
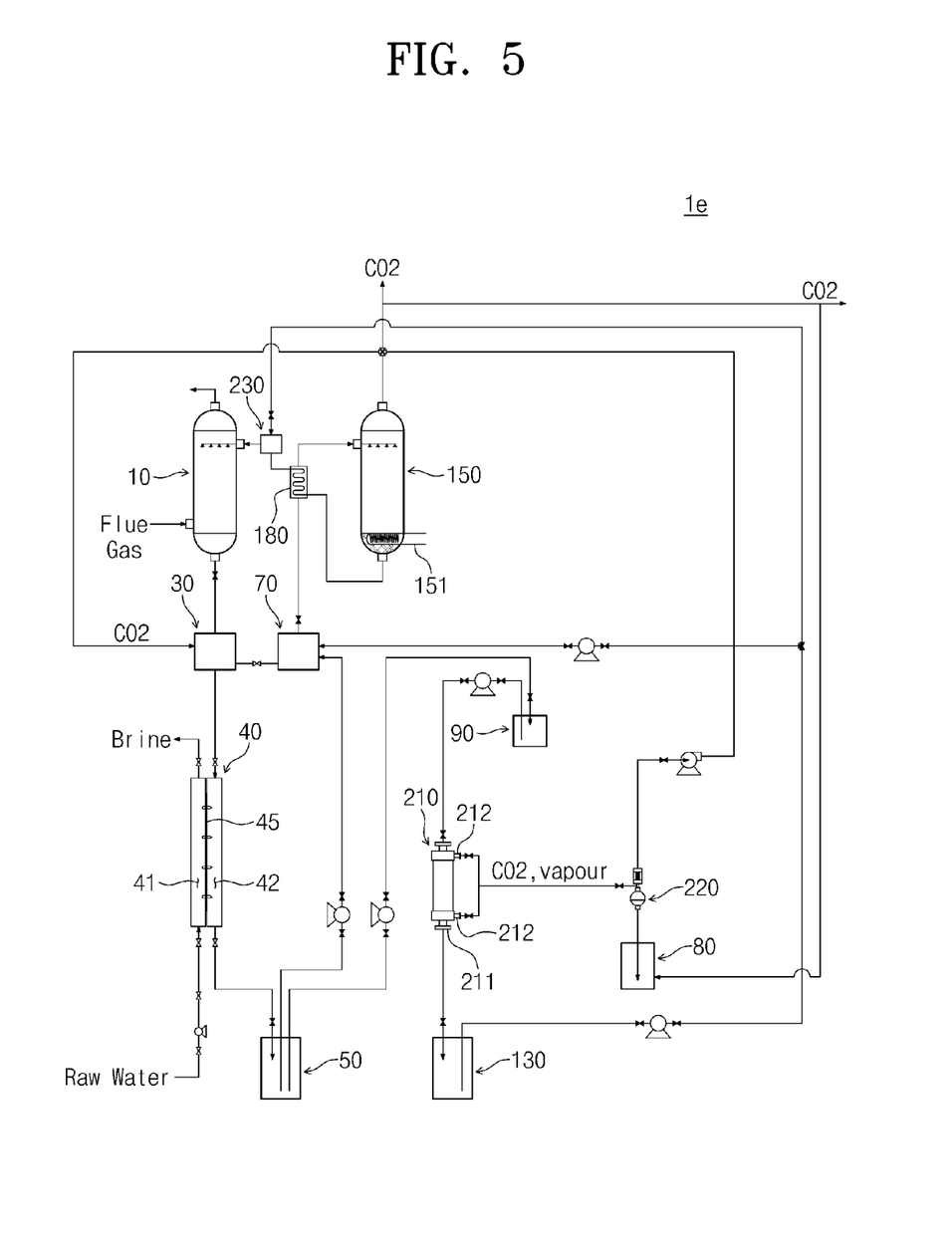
FIG. 5 schematically shows an apparatus for integrating carbon dioxide capture and desalination according to a fifth embodiment of the present invention.

FIG. 5 schematically shows an apparatus 1e for integrating carbon dioxide capture and desalination according to a fifth embodiment of the present invention. In the present embodiment, the same elements as described in the embodiments described above will be indicated by the same reference numbers or the same reference designators, and the detail descriptions thereto will be omitted.

In the present embodiment, non-volatile monoethanolamine (MEA) is used as the absorbent absorbing carbon dioxide unlike the first to fourth embodiments described above. The MEA may also be dissolved in water to make the osmotic pressure gradient. Thus, an absorption solution of the present embodiment, which is used in the absorption unit 10, may be used as the draw solution in the forward osmosis separator 40.

The MEA is an example of the absorbent in the present embodiment. In other embodiments, various materials capable of absorbing the carbon dioxide and of dissolving in water to make the osmotic pressure gradient may be used as the absorbent. For example, another amine-based absorbent except the MEA may be used in the present embodiment. A non-volatile absorbent will also be used in sixth, seventh, and eighth embodiments described below.

Since the MEA has non-volatility, it is hardly evaporated in the absorption unit 10 and the carbon dioxide separating unit 150. Thus, the first and second cleaning towers 20 and 160 of the embodiments described above may be omitted in the present embodiment.

Functions of the absorption unit 10, the draw solution chamber 30, the forward osmosis separator 40, the diluted-draw solution chamber 50, the buffer chamber 70, and the carbon dioxide separating unit 150 of the present embodiment are the substantially same as described in the aforementioned embodiments.

The draw solution passing through the forward osmosis separator 40 passes through the diluted-draw solution chamber and the heating chamber 90 and then flows into a first separating unit 210.

The first separating unit 210 separates gas-phase materials from the diluted draw solution passing through the forward osmosis separator 40. In the present embodiment, the first separating unit 210 may be a membrane contactor. Since the MEA has the non-volatility, the gas-phase materials separated in the first separating unit 210 have carbon dioxide and vapor. In other words, a concentrated draw solution including the MEA is outputted through a first outlet 211 of the first separating unit 210, and the carbon dioxide and the vapor are outputted through of a second outlet 212 of the first separating unit 210.

The first separating unit 210 is fluidly connected to the buffer chamber 70. Thus, the draw solution outputted through the first outlet 211 of the first separating unit 210 passes through the concentrated-draw solution chamber 130 and then flows into the buffer chamber 70.

The gas-phase materials, which are outputted through the second outlet 212 of the first separating unit 210, flow into a second separating unit 220.

The second separating unit 220 separates the carbon dioxide from the gas-phase materials supplied from the first separating unit 210 to obtain fresh water. In the present embodiment, the second separating unit 220 may be a condenser. The condenser 220 condenses only the vapor among the gas-phase materials supplied from the first separating unit 210. The vapor is condensed into the fresh water in the condenser 220, and the fresh water is supplied into the fresh water chamber 80. The carbon dioxide outputted from the condenser 220 may be moved into and stored in an additional space.

In the present embodiment, the carbon dioxide may be separated in the second separating unit 220 and the carbon dioxide separating unit 150, and the separated carbon dioxide may be captured.

As described in the first embodiment, a portion of the carbon dioxide separated in the second separating unit 220 and the carbon dioxide separating unit 150 may flow into the fresh water chamber 80 storing the fresh water separated in the second separating unit 220 so as to be used in the post-treatment process (in particular, the carbon oxide absorption process) of the fresh water.

Meanwhile, an absorption solution concentration adjusting chamber 230 may be disposed between the absorption unit 10 and the carbon dioxide separating unit 150. A portion of the draw solution separated from the gas-phase material in the first separating unit 210 may flow into the absorption solution concentration adjusting chamber 230 to adjust a concentration and the amount of the absorption solution absorbing the carbon dioxide.

Figure 6:
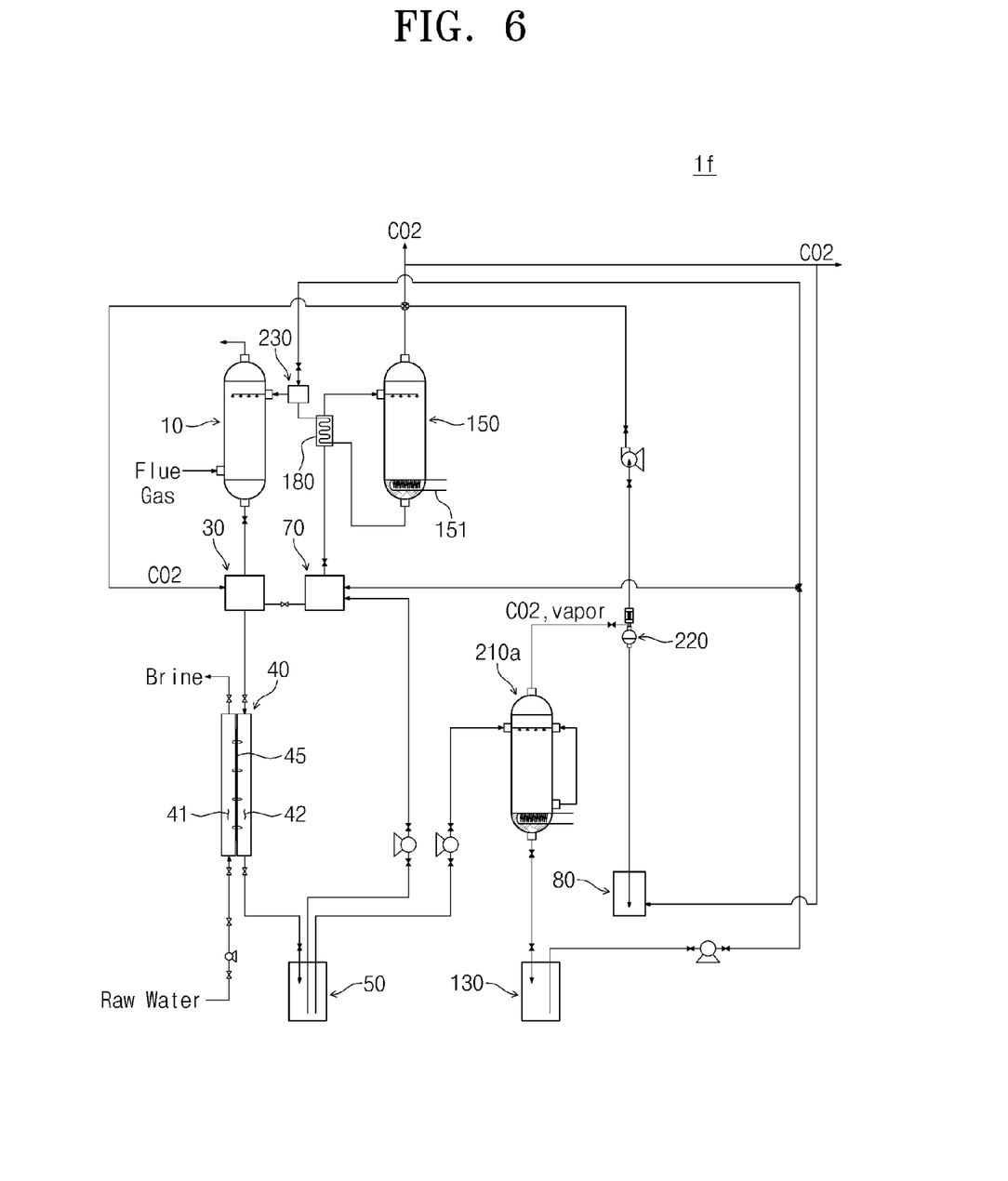
FIG. 6 schematically shows an apparatus for integrating carbon dioxide capture and desalination according to a sixth embodiment of the present invention.

FIG. 6 schematically shows an apparatus 1f for integrating carbon dioxide capture and desalination according to a sixth embodiment of the present invention. In the present embodiment, the same elements as described in the embodiments described above will be indicated by the same reference numbers or the same reference designators, and the detail descriptions thereto will be omitted.

The present embodiment is similar to the fifth embodiment. However, a separation tower 210a performs the function of the first separating unit 210 in the present embodiment. The separation tower 210a separates the gas-phase materials dissolving in the draw solution supplied from the diluted-draw solution chamber 50 by using a partial pressure difference. To achieve this, a heater for heating the draw solution may be installed at the separation tower 210a or the inside of the separation tower 210a may be decompressed. The pressure of the inside of the separation tower 210a may become close to a vacuum pressure when the inside of the separation tower 210a is decompressed. A portion of the vapor and the carbon dioxide, which are included in the draw solution, becomes gas-phase materials, and the gas-phase materials flow out from the separation tower 210a. The gas-phase materials flowing out from the separation tower 210a flow into the second separating unit 220. The draw solution remaining in a lower portion of the separation tower 210a flows into the buffer chamber 70 through the concentrated-draw solution chamber 130.

In comparison to the fifth embodiment, the separation tower 210a is used in the present embodiment to simplify components of the apparatus 1f for integrating carbon dioxide capture and desalination.

Figure 7:
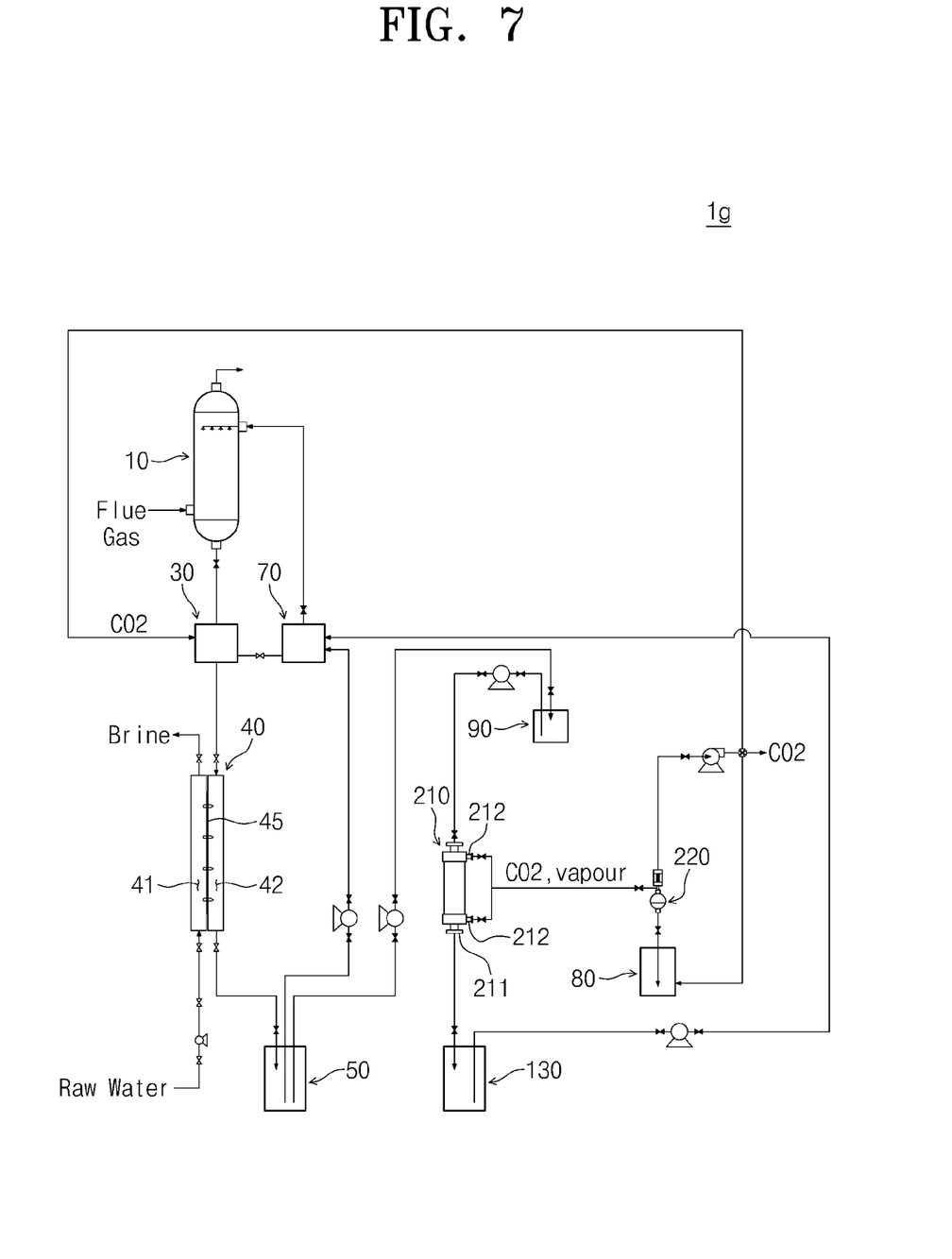
FIG. 7 schematically shows an apparatus for integrating carbon dioxide capture and desalination according to a seventh embodiment of the present invention.

FIG. 7 schematically shows an apparatus 1g for integrating carbon dioxide capture and desalination according to a seventh embodiment of the present invention. In the present embodiment, the same elements as described in the embodiments described above will be indicated by the same reference numbers or the same reference designators, and the detail descriptions thereto will be omitted.

The present embodiment is similar to the fifth embodiment. However, the carbon dioxide separating unit 150 used in the first embodiment is omitted in the present embodiment. Thus, the carbon dioxide is separated in only the second separating unit 220. In addition, the absorption solution used in the absorption unit 10 is supplied from the buffer chamber 70. In other words, a portion of the draw solution stored in the buffer chamber 70 flows into the absorption unit 10 so as to be used as the absorption solution absorbing the carbon dioxide.

In comparison to the fifth embodiment, the carbon dioxide separating unit 150 of the fifth embodiment is omitted in the present embodiment. Thus, components of the apparatus 1g are simplified.

Figure 8:
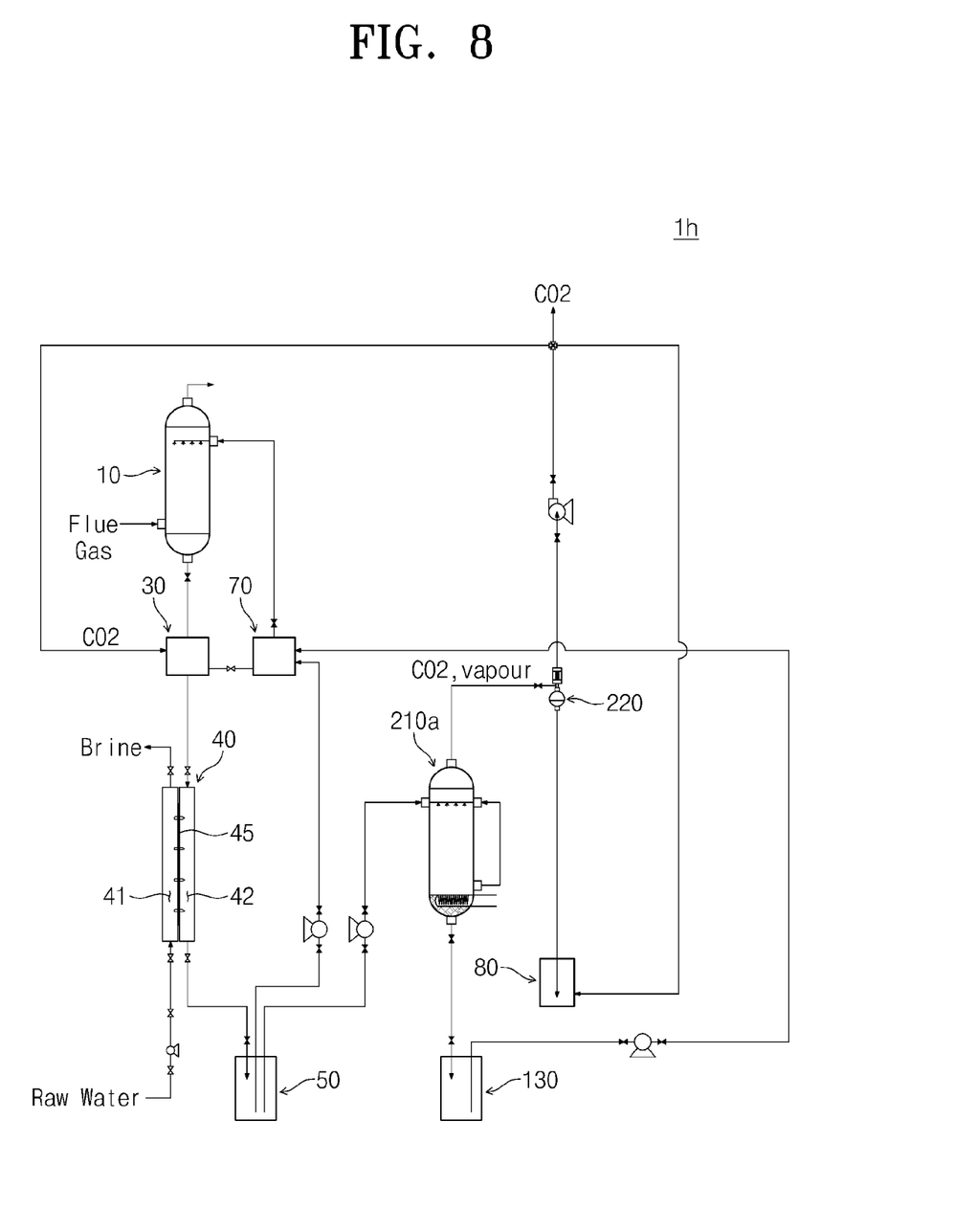
FIG. 8 schematically shows an apparatus for integrating carbon dioxide capture and desalination according to an eighth embodiment of the present invention.

FIG. 8 schematically shows an apparatus 1h for integrating carbon dioxide capture and desalination according to an eighth embodiment of the present invention. In the present embodiment, the same elements as described in the embodiments described above will be indicated by the same reference numbers or the same reference designators, and the detail descriptions thereto will be omitted.

The present embodiment is similar to the sixth embodiment. However, the carbon dioxide separating unit 150 used in the sixth embodiment is omitted in the present embodiment. Thus, the carbon dioxide is separated in only the second separating unit 220. In addition, the absorption solution used in the absorption unit 10 is supplied from the buffer chamber 70. In other words, a portion of the draw solution stored in the buffer chamber 70 flows into the absorption unit 10 so as to be used as the absorption solution absorbing the carbon dioxide.

In comparison to the sixth embodiment, the carbon dioxide separating unit 150 of the sixth embodiment is omitted in the present embodiment. Thus, components of the apparatus 1h are simplified.

While the present invention has been described with reference to example embodiments, it will be apparent to those skilled in the art that various changes and modifications may be made without departing from the spirits and scopes of the present invention. Therefore, it should be understood that the above embodiments are not limiting, but illustrative. Thus, the scopes of the present invention are to be determined by the broadest permissible interpretation of the following claims and their equivalents, and shall not be restricted or limited by the foregoing description.

What is claimed is:

1. An apparatus for integrating a carbon dioxide capture function and a desalination function, the apparatus comprising:
   an absorption unit absorbing carbon dioxide included in a flue gas by bringing the flue gas into contact with an absorption solution in which a volatile absorbent absorbing carbon dioxide is dissolved;
   a draw solution chamber storing the absorption solution that flows in from the absorption unit, the draw solution chamber using the absorption solution as a draw solution;
   a forward osmosis separator separating fresh water from raw water by a forward osmosis method using the draw solution flowing in from the draw solution chamber;
   a buffer chamber fluidly connected to the draw solution chamber, the draw solution passing through the forward osmosis separator to become a diluted draw solution, and a portion of the diluted draw solution flowing into the buffer chamber;
   a fresh water separating unit separating fresh water from the diluted draw solution that has passed through the forward osmosis separator;
   a carbon dioxide separating unit separating carbon dioxide from the draw solution supplied from the buffer chamber, the carbon dioxide separating unit fluidly connected to the absorption unit such that the draw solution, from which the carbon dioxide is separated, flows into the absorption unit so as to be reused as the absorption solution; and a control unit controlling concentrations and amounts of the draw solutions stored in the draw solution chamber and the buffer chamber, wherein a portion of the carbon dioxide separated in the carbon dioxide separating unit flows into the draw solution chamber.

2. The apparatus of claim 1, further comprising:
a diluted-draw solution chamber disposed between the forward osmosis separator and the fresh water separating unit and storing the diluted draw solution supplied from the forward osmosis separator, the diluted-draw solution chamber supplying a draw solution to the fresh water separating unit and the buffer chamber, wherein the control unit controls the amount of the draw solution supplied from the diluted-draw solution chamber to the buffer chamber.

3. The apparatus of claim 1, further comprising:
a condenser condensing only vapor among gas-phase materials that are separated from the fresh water by the fresh water separating unit, wherein water condensed in the condenser flows into the fresh water separating unit.

4. The apparatus of claim 1, wherein the fresh water separating unit includes a first membrane contactor that separates a gas-phase material dissolved in the draw solution.

5. The apparatus of claim 4, further comprising:
a solid-phase material capture chamber capturing a solid-phase material generated by cooling the gas-phase material flowing in from the first membrane contactor, wherein a portion of the diluted draw solution supplied from the forward osmosis separator flows into the solid-phase material capture chamber, and wherein the solid-phase material is dissolved in the draw solution in the solid-phase material capture chamber and then flows into the buffer chamber.

6. The apparatus of claim 5, wherein the gas-phase material in the solid-phase material capture chamber flows into the carbon dioxide separating unit.

7. The apparatus of claim 5, further comprising:
a second membrane contactor dissolving the gas-phase material flowing in from the solid-phase material capture chamber in a draw solution;

a concentrated-draw solution chamber storing the draw solution flowing out from the second membrane contactor; and a circulating pump supplying a portion of the draw solution stored in the concentrated-draw solution chamber into the second membrane contactor, wherein the draw solution remaining in the concentrated-draw solution chamber is supplied into the buffer chamber.

8. The apparatus of claim 1, wherein the fresh water separating unit includes a separation tower that separates a gas-phase material, which is dissolved in the diluted draw solution passing through the forward osmosis separator, by using a partial pressure difference.

9. The apparatus of claim 1, further comprising:
a first cleaning tower dissolving the volatile absorbent, which is included in a gas-phase material flowing in from the absorption unit, in the draw solution; and a second cleaning tower dissolving the volatile absorbent, which is included in a gas-phase material flowing in from the carbon dioxide separating unit, in the draw solution.

10. The apparatus of claim 9, further comprising:
a concentration tower into which the draw solutions including the volatile absorbent flow from the first and second cleaning towers, wherein a gas-phase volatile absorbent existing in the concentration tower flows into the carbon dioxide separating unit, and wherein the draw solution existing in the concentration tower flows again into the first and second cleaning towers to repeatedly dissolve the volatile absorbent existing in the first and second cleaning towers.

11. The apparatus of claim 9, wherein a portion of the fresh water separated in the fresh water separating unit flows into the first and second cleaning towers to dissolve portions of the volatile absorbent and then flows into the fresh water separating unit.

12. An apparatus for integrating a carbon dioxide capture function and a desalination function, the apparatus comprising:

an absorption unit absorbing carbon dioxide included in a flue gas by bringing the flue gas into contact with an absorption solution in which a non-volatile absorbent absorbing carbon dioxide is dissolved;

a draw solution chamber storing the absorption solution that flows in from the absorption unit, the draw solution chamber using the absorption solution as a draw solution;

a forward osmosis separator separating fresh water from raw water by a forward osmosis method using the draw solution flowing in from the draw solution chamber;

a buffer chamber fluidly connected to the draw solution chamber, the draw solution passing through the forward osmosis separator to become a diluted draw solution, and a portion of the diluted draw solution flowing into the buffer chamber;

a first separating unit separating a gas-phase material from the diluted draw solution that has passed through the forward osmosis separator, the first separating unit fluidly connected to the buffer chamber such that a draw solution concentrated by separating the gas-phase material flows into the buffer chamber;

a second separating unit separating carbon dioxide from the gas-phase material flowing in from the first separating unit to obtain fresh water; and a control unit controlling concentrations and amounts of the draw solutions stored in the draw solution chamber and the buffer chamber, wherein a portion of the carbon dioxide separated in the second separating unit flows into the draw solution chamber.

13. The apparatus of claim 12, further comprising:
a diluted-draw solution chamber disposed between the forward osmosis separator and the first separating unit and storing the diluted draw solution supplied from the forward osmosis separator, the diluted-draw solution chamber supplying a draw solution to the first separating unit and the buffer chamber, wherein the control unit controls the amount of the draw solution supplied from the diluted-draw solution chamber to the buffer chamber.

14. The apparatus of claim 12, wherein the second separating unit comprises: a condenser condensing only vapor of the gas-phase material supplied from the first separating unit to make fresh water.

15. The apparatus of claim 12, wherein the first separating unit includes a membrane contactor.

16. The apparatus of claim 12, wherein the first separating unit includes a separation tower that separates the gas-phase material from the diluted draw solution passing through the forward osmosis separator using a partial pressure difference by heating.

17. The apparatus of claim 12, wherein a portion of the draw solution stored in the buffer chamber flows into the absorption unit to act as the absorption solution absorbing carbon dioxide.

18. The apparatus of claim 12, further comprising:
a carbon dioxide separating unit separating carbon dioxide from the draw solution supplied from the buffer chamber,
wherein the carbon dioxide separating unit is fluidly connected to the absorption unit such that the draw solution, from which the carbon dioxide is separated, flows into the absorption unit so as to be reused as the absorption solution.

19. The apparatus of claim 18, further comprising:
an absorption solution concentration adjusting chamber disposed between the absorption unit and the carbon dioxide separating unit,
wherein a portion of the draw solution separated from the gas-phase material in the first separating unit flows into the absorption solution concentration adjusting chamber.

20. The apparatus of claim 12, wherein a portion of the carbon dioxide separated in the second separating unit is absorbed in the fresh water separated in the second separating unit so as to be used in a post-treatment process of the fresh water.

* * * * *